(12) United States Patent
Kono et al.

(10) Patent No.: US 7,990,099 B2
(45) Date of Patent: Aug. 2, 2011

(54) POWER CONVERTING DEVICE FOR ELECTRIC TRAIN

(75) Inventors: Masaki Kono, Tokyo (JP); Keita Hatanaka, Tokyo (JP)

(73) Assignee: Mitsubishi Electric Corporation, Chiyoda-Ku, Tokyo (JP)

(*) Notice: Subject to any disclaimer, the term of this patent is extended or adjusted under 35 U.S.C. 154(b) by 772 days.

(21) Appl. No.: 11/941,379

(22) Filed: Nov. 16, 2007

(65) Prior Publication Data

US 2009/0009119 A1    Jan. 8, 2009

(30) Foreign Application Priority Data

Jul. 6, 2007   (JP) ................................. 2007-178992

(51) Int. Cl.
*H02P 27/04*   (2006.01)
(52) U.S. Cl. ......... 318/802; 318/430; 318/800; 318/801
(58) Field of Classification Search .............. 318/430, 318/800, 801, 802
See application file for complete search history.

(56) References Cited

U.S. PATENT DOCUMENTS

| | | | |
|---|---|---|---|
| 5,847,534 A * | 12/1998 | Tanamachi et al. ........... | 318/801 |
| 6,301,530 B1 * | 10/2001 | Tamura .......................... | 701/23 |
| 6,429,620 B2 * | 8/2002 | Nakazawa ..................... | 318/701 |
| 2003/0173921 A1 * | 9/2003 | Nakazawa ..................... | 318/432 |
| 2005/0088135 A1 * | 4/2005 | Sato .............................. | 318/717 |
| 2006/0192508 A1 * | 8/2006 | Albers ........................... | 318/128 |

FOREIGN PATENT DOCUMENTS

| | | |
|---|---|---|
| JP | 61-058405 (A) | 3/1986 |
| JP | 62-244201 | 10/1987 |
| JP | 3-021901 (Y2) | 5/1991 |

OTHER PUBLICATIONS

Office Action in KR 10-2007-0129863 dated Jul. 15, 2009, and English-language translation, 6 pages.

* cited by examiner

*Primary Examiner* — Walter Benson
*Assistant Examiner* — Kawing Chan
(74) *Attorney, Agent, or Firm* — Buchanan Ingersoll & Rooney PC

(57) ABSTRACT

A power converting device for an electric train includes a power converter, an alternating-current motor, a primary control unit, and a control unit. The power converter converts direct-current power into alternating-current power. The alternating-current motor is driven by the alternating-current power output from the power converter. The primary control unit outputs a power-running notch command that determines an acceleration speed for the electric train. The control unit controls an amount of the alternating-current power based on the power-running notch command. The control unit sets the amount of the alternating-current power to zero without a delay after receiving an OFF signal of the power-running notch command during power running.

1 Claim, 5 Drawing Sheets

FIG.9 ical and industrial significance of this invention will be
POWER CONVERTING DEVICE FOR ELECTRIC TRAIN

BACKGROUND OF THE INVENTION

1. Field of the Invention

The present invention relates to a power converting device for an electric train.

2. Description of the Related Art

In a power converting device for an electric train, for example, Japanese Examined Utility Model Application Publication No. H3-21901 discloses a conventional technology concerning a power-running notch command, in which an opening timing of the power converting device is shifted for each unit when an OFF signal of the power-running notch command is input (i.e., the power-running notch command in ON state enters OFF state), to prevent an abrupt rise of an overhead line voltage when an overcurrent is flown into the power converting device.

Japanese Patent Application Laid-open No. S61-58405 discloses a technology for driving an electric train by changing the voltage-to-frequency ratio of output of a power converting device and a slip frequency of an AC motor such that the electric train is operable in a substantially no-load condition after input of an OFF signal of a power-running notch command other than a minimum notch command, or an input of an OFF signal for braking in an regenerating area. In this manner, an optimum coasting characteristics of the electric train can be obtained.

When an OFF signal of the power-running notch command is input, a torque is sometimes generated in the AC motor, which may accelerates the electric train. In a railyard or an inspection yard where the electric train is inspected, a notch command is repeatedly turned on and off to stop the electric train slowly at a specified position. If the electric train is accelerated with the torque generated when the OFF signal of the power-running notch command is input, the electric train can hardly be stopped at the specified position.

Figure 3:
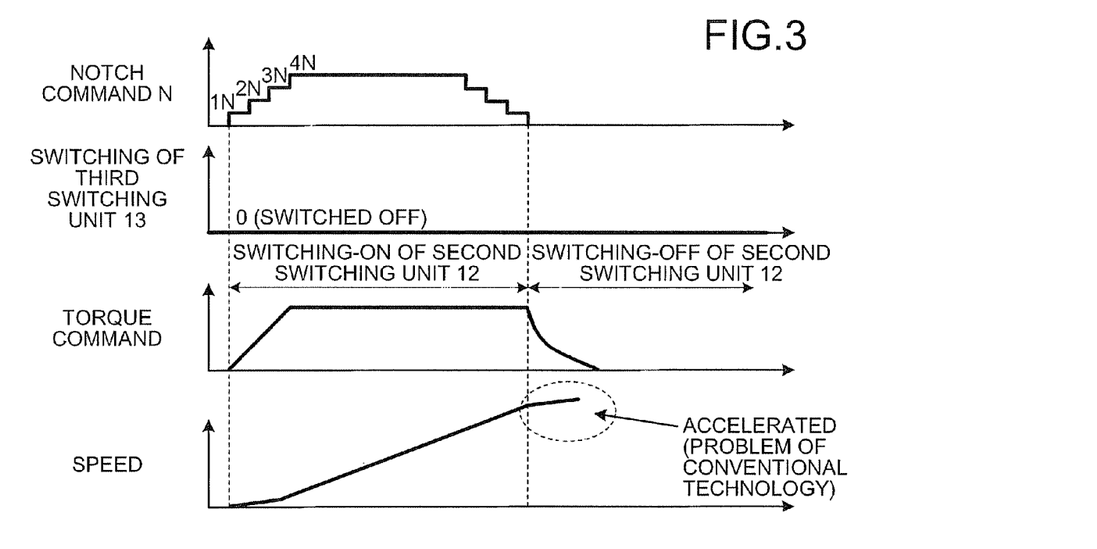
FIG. 3 is a timing chart of variation in a torque command not based on a notch command 1N.

In a typical electric train, a power-running notch command is issued via a drive lever provided in a driver's cab. Based on the power-running notch command, a power-running torque command is decided. When the power-running notch command is turned OFF, the power-running torque command gradually becomes zero as shown in FIG. 3. When such control is performed, although a shock can be reduced, the electric train may be accelerated depending on the situation, which makes it difficult to stop the electric train at a specified position. Especially in a railyard and an inspection yard, the electric train is required to stop at the specified position with a strict tolerance, and thus, there is an increasing demand for a technology for stopping the electric train at a specified position precisely.

SUMMARY OF THE INVENTION

It is an object of the present invention to at least partially solve the problems in the conventional technology.

According to an aspect of the present invention, a power converting device for an electric train, includes a power converter that converts direct-current power into alternating-current power; an alternating-current motor that is driven by the alternating-current power output from the power converter; a primary control unit that outputs a power-running notch command that determines an acceleration speed for the electric train; and a control unit that controls an amount of the alternating-current power output from the power converter based on the power-running notch command. The control unit sets the amount of the alternating-current power output from the power converter to zero without a delay after receiving an OFF signal of the power-running notch command during power running.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

Figure 1:
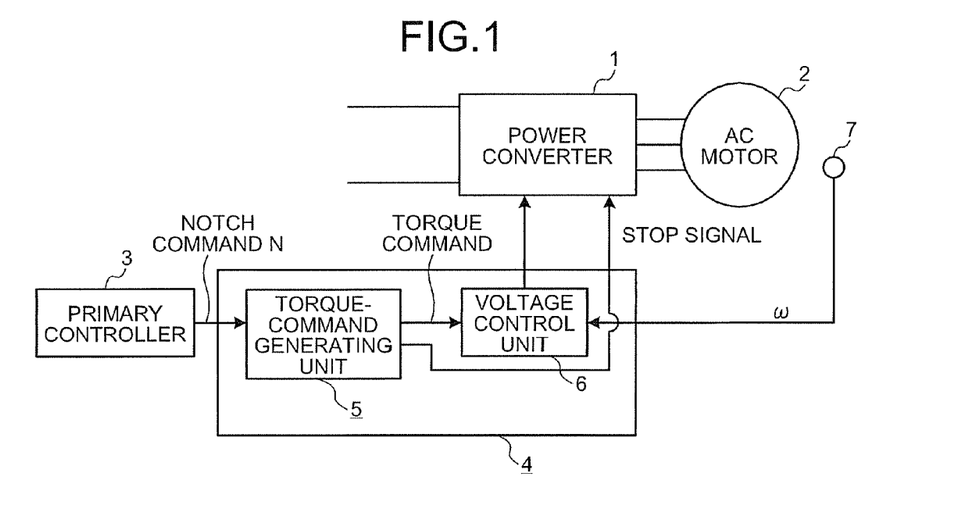
FIG. 1 is a block diagram of a power converting device of an electric train according to a first embodiment of the present invention.

FIG. 1 is a block diagram of a power converting device of an electric train according to a first embodiment of the present invention. The power converting device includes a power converter 1, an AC motor (induction motor) 2, a primary controller 3, and a control unit 4. The power converter 1 converts a DC power (DC voltage) to an AC power (AC voltage). The AC motor 2 is driven with the AC power output from the power converter 1 to drive an electric train, and mounted with a speed detecting unit 7. The primary controller 3 outputs a power-running notch command (i.e., a drive command) that determines an acceleration speed of the electric train. The control unit 4 controls the amount of the AC power output from the power converter 1 based on the power-running notch command. The control unit 4 includes a torque-command generating unit 5 that generates a torque command, and a voltage control unit 6 that controls the voltage output from the power converter 1 based on the torque command. When an OFF signal of the power-running notch command is input to the control unit 4 from the primary controller 3 during power running of the electric train, the amount of the AC power output from the power converter 1 becomes zero without a delay (immediately). This operation is explained below.

The primary controller 3, which is operated by a driver, controls the electric train, i.e., issues control signals for power-running, braking, speed changing, and changing a direction in which the electric train is operated. The primary controller 3 outputs a command that determines an acceleration speed of the electric train. The acceleration speed corresponds to an amount of the torque output from the AC motor 2. The primary controller 3 inputs a notch command N to the torque-command generating unit 5. The notch command N is explained below. In the electric train, the drive command is output stepwise such that a current for acceleration is constant and a pulling force (torque) is kept within a specified range for smooth acceleration. The step in the drive command is called "notch", and the notch command N is decided based on the relation between a current, the speed, and the pulling force of the AC motor 2.

Figure 2:
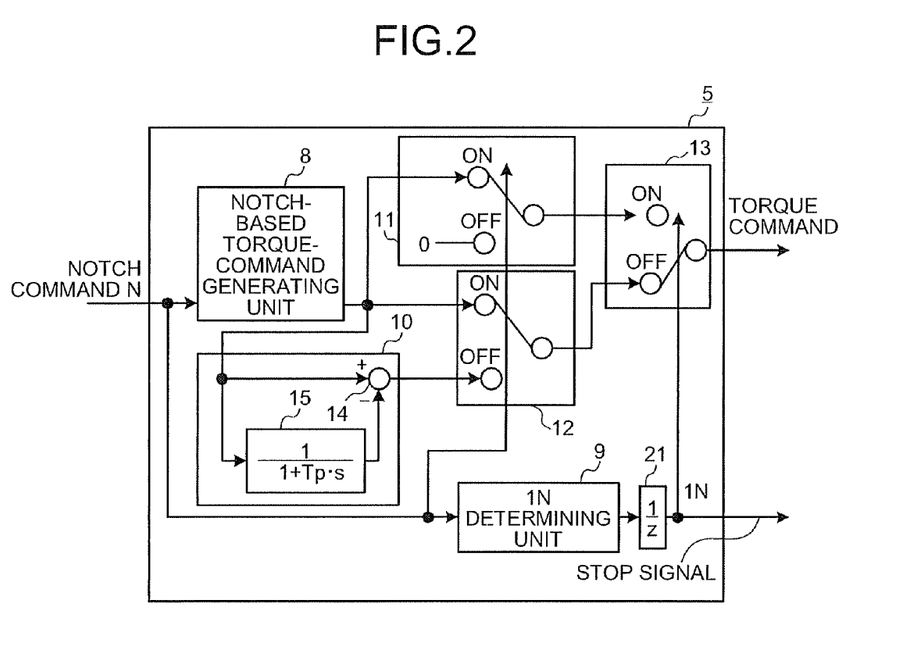
FIG. 2 is a block diagram of a torque-command generating unit shown in FIG. 1.

The notch command N output from the primary controller 3 is input to the torque-command generating unit 5. FIG. 2 is a block diagram of the torque-command generating unit 5. The torque-command generating unit 5 includes a notch-based torque-command generating unit 8, a 1N determining unit 9, a torque-command stopping unit 10, a first switching unit 11, a second switching unit 12, and a third switching unit 13.

Figure 9:
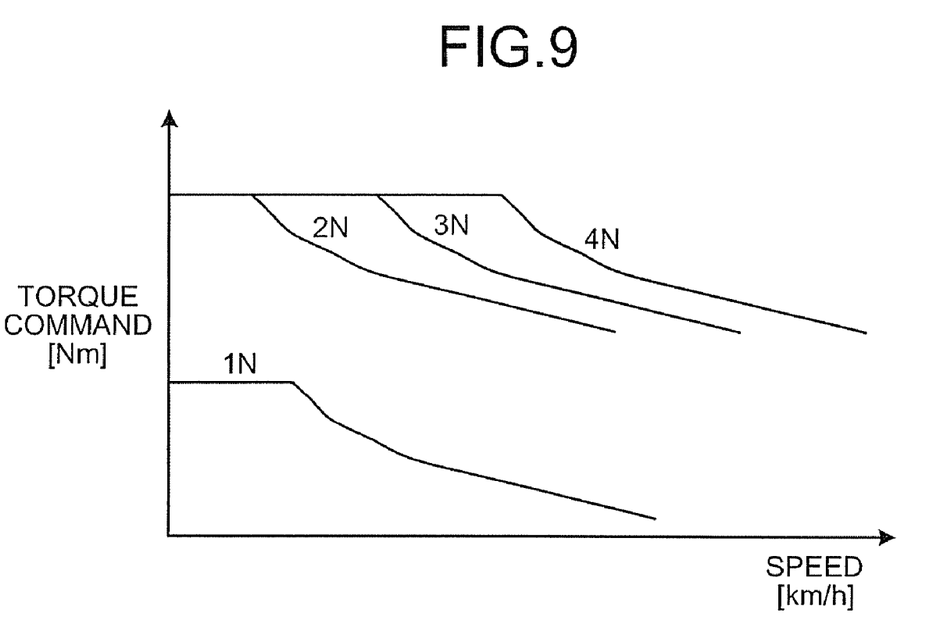
FIG. 9 is a graph of a relation between a speed and a torque command of each notch command.

The notch-based torque-command generating unit 8 generates a torque command based on the notch command N and outputs the torque command. The notch command N is output stepwise as shown in FIG. 3. For example, when the notch command N is output at a voltage level of 5 volts (V) and a maximum notch command is set as 4N, 4N is 5 V, 1N is 1.25 V, 2N is 2.5 V, and 3N is 3.75 V. In this description, "notch command 1N" is equivalent to "1-notch command". Based on the notch command N, the notch-based torque-command generating unit 8 outputs a torque command that corresponds to a speed as shown in FIG. 9. The notch command 1N is a minimum notch command that represents an acceleration speed corresponding to a torque command of 500 Newton-meter (Nm) or less.

The torque command output from the notch-based torque-command generating unit 8 is input to the torque-command stopping unit 10, to the first switching unit 11, and to the second switching unit 12. Each of the first switching unit 11 and the second switching unit 12 switches between ON and OFF based on the notch command N output from the primary controller 3. When the notch command N is input (the notch command is equal to 1N or larger), the second switching unit 12 switches ON. When the notch command N is OFF (0 V), the second switching unit 12 switches OFF.

The 1N determining unit 9 determines whether the notch command N is 1N. When the notch command N is 1N, the 1N determining unit 9 outputs 1 and the third switching unit 13 switches ON, and thus, the second switching unit 12 is selected. When the notch command N is other than 1N (i.e., OFF, 2N, 3N, or 4N), the 1N determining unit 9 outputs 0, and thus, the third switching unit 13 switches OFF and the second switching unit 12 is selected. When the notch command N is OFF, the second switching unit 12 switches OFF, and accordingly, an output from the torque-command stopping unit 10 is selected. An operation performed after the input of the notch command N other than 1N is explained below with reference to FIG. 3. When the notch command N is 4N, the third switching unit 13 switches OFF and the notch-based torque-command generating unit 8 outputs a torque command corresponding to 4N. While the notch command N is input, the second switching unit 12 switches ON. When the notch command N is OFF, the second switching unit 2 switches OFF and the torque-command stopping unit 10 starts an operation.

When the notch command is OFF and a torque command becomes zero without a delay, a torque shock is caused in the electric train body and passengers feel uncomfortable. To prevent the torque shock, the torque command is turned OFF with a first-order delay. The effect obtained when the torque command is turned OFF with a gradient represented by a curved line shown in FIG. 3 can be obtained when the torque command is turned OFF with a gradient represented by a straight line. Because the time constant and the gradient with a first-order delay is set so as not to generate a torque shock, the time constant needs to be set sufficiently longer than a second time constant (secondary inductance/secondary resistance) of a motor constant of the AC motor 2. However, when the time constant with the first-order delay is set longer than the second time constant, a torque is generated in the AC motor 2, which accelerates the electric train.

To prevent the above acceleration, the torque command is set to zero without a delay after the notch command 1N, or a command for stopping the electric train at a specified position in a railyard or an inspection yard, is turned OFF. Accordingly, the electric train can be stopped at a specified position easily.

An operation for immediately setting the torque command to zero is explained below. This operation is performed not only when the notch command 1N becomes zero but also when a notch command representing an acceleration speed corresponding to 500 Nm or smaller, or a minimum notch command that is used to stop the electric train, is turned OFF.

Figure 4:
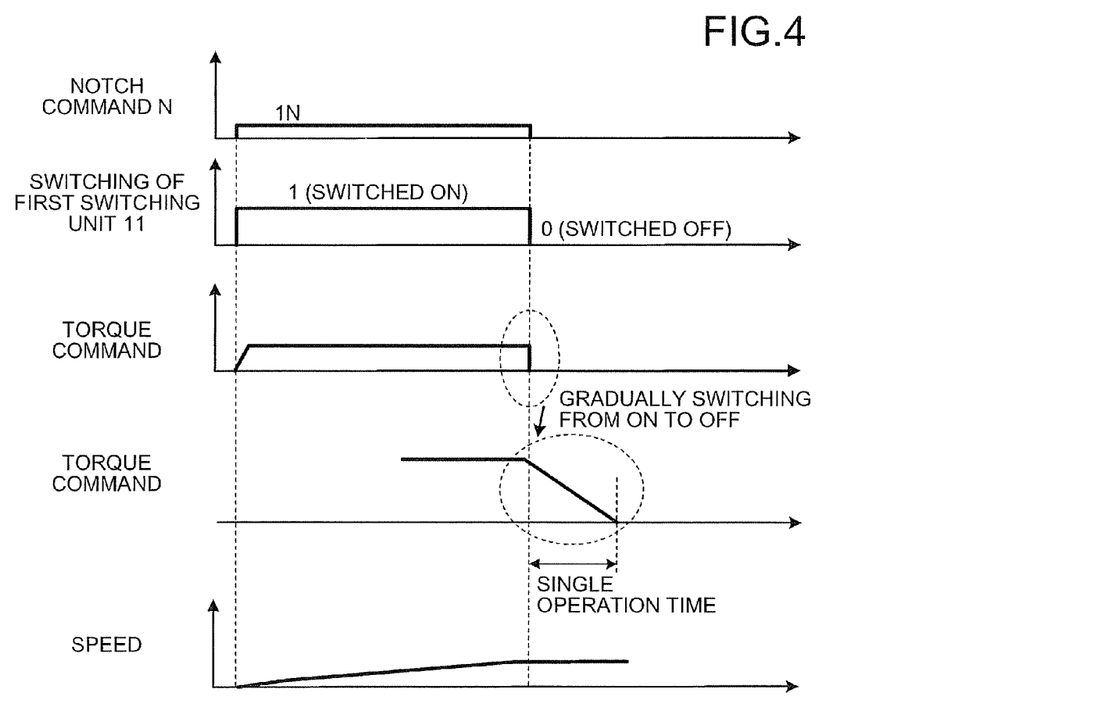
FIG. 4 is a timing chart of variation in a torque command based on a notch command 1N.

An operation for setting the notch command 1N to zero is explained with reference to FIGS. 2 and 4. FIG. 4 is a timing chart of variation in a torque command 1N. When the notch command N is 1N, the third switching unit 13 switches ON because of the operation performed by the 1N determining unit 9 and a delaying element 21. The notch-based torque-command generating unit 8 outputs a torque command corresponding to the notch command 1N shown in FIG. 9, and the torque command is input to the first switching unit 11. When the notch command N is ON, the first switching unit 11 switches ON, and thus, the torque command is output via the third switching unit 13. This operation is represented by "SWITCHED ON" shown in FIG. 4. When the notch command is OFF, the operation performed during a period represented by "SWITCHED OFF" shown in FIG. 4 is performed.

When the notch command 1N is turned OFF, the first switching unit 11 switches OFF and the third switching unit 13 switches OFF with an arbitrary delay. Because the third switching unit 13 switches ON before the arbitrary time period (delay) passes, the first switching unit 11 switching OFF output 0. In this manner, the torque command becomes zero immediately. When the torque command becomes zero, the voltage control unit 6 controls the power converter 1 such that that the power converter 1 outputs a torque command of 0.

Because the notch command 1N is turned OFF, the output of the 1N determining unit 9 becomes zero. Because of the delaying element 21, the output of the 1N determining unit 9 becomes zero with a delay equivalent to time required for a single operation performed by a microcomputer (hereinafter, "single operation time"). Accordingly, the third switching unit 13 switches OFF with the delay equivalent to the single operation time. A stop signal for stopping the power converter 1 is output to the power converter 1 with the delay equivalent to the single operation time, so that the power converter 1 stops (i.e., the AC voltage that is output to the AC motor 2 from the power converter 1 becomes zero). Because a delay longer than the second time constant of the AC motor 2 results in generation of a torque, the torque command needs to become 0 as soon as possible. In other words, the single operation time needs to be sufficiently shorter than the second time constant of the AC motor 2 that is typically equal to 250 milliseconds (ms) or more. Specifically, the second time constant of the AC motor 2 needs to be equal to 1/10 of 250 ms, i.e., 25 ms, or less. While the single operation time sometimes varies because of the microcomputer, the amount of the torque hardly varies so that the electric train is not accelerated even if a time shorter than 0.1 microsecond (μs) is required to set the AC voltage that is output to the AC motor 2 from the power converter 1 to zero. For this reason, the single operation time of the microcomputer needs to be within 25 ms from 0.1 μs. In addition, within 25 ms from 0.1 μs (i.e., with the delay), the third switching unit 13 needs to switch OFF and the torque command needs to become zero.

When the notch signal N1 is turned OFF, the signal output from the delaying element 21 becomes zero (i.e., the signal is turned OFF) after the single operation time. When the signal is turned OFF, the signal is passed to the power converter 1 and the power converter 1 stops. In this manner, the power converter 1 can be OFF immediately after the input of the OFF signal of the notch command to the control unit 4 from the primary controller 3 during the power running.

The first switching unit 11 constitutes a first torque-command generating unit that sets the torque command to zero within 25 ms from 0.1 μs after the OFF signal of the acceleration command is input while the notch signal 1N is input. The torque-command stopping unit 10 and the second switching unit 12 constitute a second torque-command generating unit that sets the torque command to zero in 100 ms or more after the OFF signal of the acceleration command is input while the notch signal N other than 1N is input. Moreover, the third switching unit 13 constitutes a switching unit that switches between the first torque-command generating unit and the second-torque-command generating unit based on the notch command for power-driving output from the primary controller 3.

Based on the torque command generated by the torque-command generating unit 5 and a frequency X detected by the speed detecting unit 7, the voltage control unit 6 outputs a command for controlling the power converter 1. The voltage control unit 6 calculates, based on a torque command from the torque-command generating unit 5 and a secondary flux command that can be determined from the motor constant and characteristics of the AC motor, a torque current command Iq* by Equation 1 as follows:

[Equation 1]

$$Iq^* = \frac{\tau^*}{\varphi^*} \times \frac{Lr}{M} \times \frac{1}{P} \quad (1)$$

where M is mutual inductance of the AC motor 2, Lr is secondary inductance of the AC motor 2, and P is a pole-pair number of the of the AC motor 2. These values are motor constants.

According to the first embodiment, the frequency ω is detected by the speed detecting unit 7. Alternatively, a sensorless control without employing the speed detecting unit 7 can also be used to calculate an estimated speed.

A flux current command Id* can be calculated, based on the secondary flux command and the mutual inductance M (the motor constant) by Equation 2 as follows:

[Equation 2]

$$Id^* = \frac{\varphi^*}{M} \quad (2)$$

Based on the torque current command Iq* calculated by Equations 1, the flux current command Id* calculated by Equations 2, and an arbitrary angular frequency ω, three-phase voltage commands Vu*, Vv*, and Vw* are output. The voltage control unit 6 calculates a slip angular frequency ωs*, based on the torque current command Iq* and the flux current command Id*, by Equation 3 as follows:

[Equation 3]

$$\omega s^* = \frac{Iq^*}{Id^*} \times \frac{Rr}{Lr} \quad (3)$$

where Rr is secondary resistance of the AC motor 2.

Based on the slip angular frequency ωs* and the arbitrary angular frequency ω, an inverter angular frequency ωinv corresponding to a frequency of a voltage command to be output by the power converter 1 is calculated by Equation 4 as follows:

[Equation 4]

$$\omega inv = \omega + \omega s^* \quad (4)$$

Based on the inverter angular frequency ωinv, the torque current command Iq*, and the flux current command Id*, a d-axis voltage command Vd* and a q-axis voltage command Vq* on the double rotating axes can be calculated by Equation 5 as follows:

[Equation 5]

$$Vd^* = Rs \times Id^* - \omega inv \times \sigma \times Ls \times Iq^* \quad (5)$$

$$Vq^* = RS \times Iq^* + \omega inv \times Ls \times Id^*$$

where Rs is primary resistance of the AC motor 2, Ls is primary inductance of the AC motor 2, and σ is 1-M*M/Ls/Lr.

A control coordinate axis is necessary when performing a coordinate conversion of a three-phase voltage or a three-phase current into orthogonal rotating coordinates, and a phase of the control coordinate axis is represented by θ based on the arbitrary angular frequency ω. The phase θ is obtained by a time integration of the inverter angular frequency ωinv, and defined by Equation 6 as follows:

[Equation 6]

$$\theta = \int \omega inv \cdot dt \quad (6)$$

Based on the d-axis voltage command Vd*, the q-axis voltage command Vq*, and the phase θ calculated by Equations 5 and 6, the three-phase voltage commands Vu*, Vv*, and Vw* are calculated. Because a voltage phase θv of the voltage command is slightly advanced, the voltage phase θv is calculated by Equation 7 as follows:

[Equation 7]

$$\theta v = \theta + \tan^{-1}\left(\frac{Vq^*}{Vd^*}\right) \quad (7)$$

Based on the voltage phase θv calculated by Equation 7, the d-axis voltage command Vd*, and the q-axis voltage command Vq*, the three-phase voltage commands Vu*, Vv*, and Vw* are calculated by Equation 8 as follows:

[Equation 8]

$$\begin{pmatrix} Vu^* \\ Vv^* \\ Vw^* \end{pmatrix} = \sqrt{(Vd^*)^2 + (Vq^*)^2} \begin{pmatrix} \cos(\theta v) \\ \cos\left(\theta v - \frac{2}{3}\Pi\right) \\ \cos\left(\theta v + \frac{2}{3}\Pi\right) \end{pmatrix} \quad (8)$$

The power converter 1 converts DC to AC based on the three-phase voltage command Vu*, Vv*, and Vw* calculated by Equation 8 by the voltage control unit 6. Based on Equation 8, the power converter 1 is controlled according to the torque command output from the torque-command generating unit 5. When the 1-notch command is turned OFF and the torque command becomes zero, the power converter 1 immediately stops. This facilitates the operation for stopping the power converter 1.

As described above, according to the first embodiment, the power converter 1 can stop immediately after an input of a signal for setting the command to the control unit 4 from the primary controller 3 during the power running. This facilitates the operation for stopping the electric train at a specified position precisely in a railyard or an inspection yard where the position at which the electric train stops is important.

The torque command can become 0 immediately after the OFF signal of the power-running notch command is input to the control unit 4 while the primary controller 3 during power running outputs the 1-notch command, the minimum notch command, or a notch command corresponding to a torque command representing an acceleration speed of 500 Nm or less. Meanwhile, after the OFF signal of the power-running notch command is input to the control unit 4 while the primary controller 3 during power running outputs a notch command other than the 1-notch command, the minimum notch command, or a notch command corresponding to a torque command representing an acceleration speed of 500 Nm or less, a process can be performed not to set the torque command to zero immediately. This reduces the shock caused when the OFF signal of the power-running notch command is input.

Figure 5:
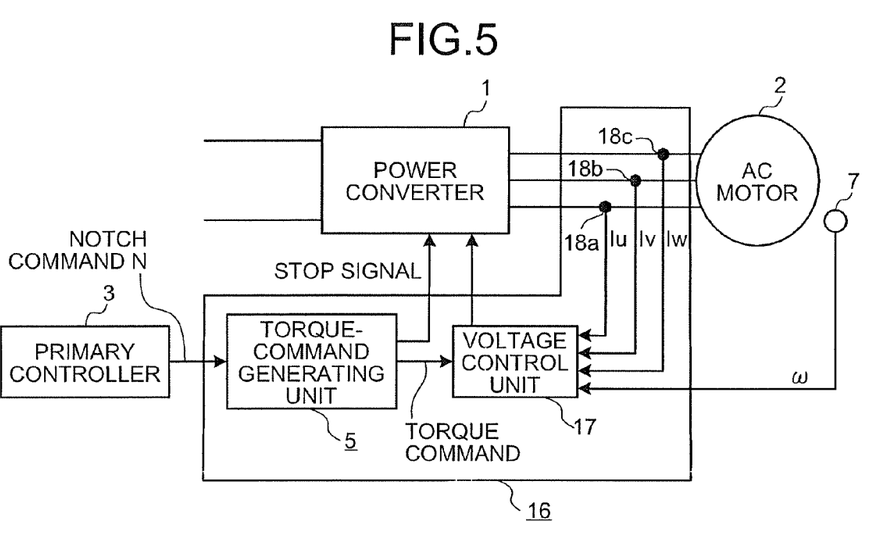
FIG. 5 is a block diagram of a power converting device of an electric train according to a second embodiment of the present invention.

FIG. 5 is a block diagram of a power converting device of an electric train according to a second embodiment of the present invention. The power converting device of the second embodiment is of construction basically similar to that of the first embodiment except for a control unit 16 and the presence of current detecting units 18a to 18c. The control unit 16 includes a voltage control unit 17. The current detecting units 18a to 18c are located on the AC side, and detect phase currents iu, iv, and iw, respectively, generated in the AC motor 2.

Based on the phase currents iu, iv, and iw detected by the current detecting units 18a to 18c and an inverter angular frequency ωinv calculated by Equation 4, a phase θ is calculated. Specifically, based on the phase θ, the phase currents iu, iv, and iw are converted into a d-axis current Id and a q-axis current Iq. A control coordinate axis is necessary for coordinate conversion of a three-phase voltage or a three-phase current into a two-phase orthogonal rotating coordinate system, and a phase of the control coordinate axis is represented by θ based on the arbitrary angular frequency ω. Based on the d-axis current Id, the q-axis current Iq, a d-axis current command Id* calculated by Equation 2, and a q-axis current command Iq* calculated by Equation 1, PI control is performed employing Equation 9, such that the detected currents correspond to the commands.

[Equation 9]

$$d\_pi = \left(kp + \frac{\omega ci}{s}\right)(Id^* - Id) \quad (9)$$

$$q\_pi = \left(kp + \frac{\omega ci}{s}\right)(Iq^* - Iq)$$

where kp and ωci are arbitrary control constants.

Based on Equation 9, the values of the detected currents can correspond to the values of the current commands. By introducing terms in Equation 9 used for controlling the current into Equation 5, Equation 10 is obtained. By setting a d-axis voltage command Vd* and a q-axis voltage command Vq* as represented by Equation 10, the torque can be prevented from becoming 0 immediately, which prevents the motor current from increasing abruptly.

[Equation 10]

$$Vd^* = Rs \times Id^* - \omega inv \times \sigma \times Ls \times Iq^* + d\_pi \quad (10)$$

$$Vq^* = Rs \times Iq^* + \omega inv \times Ls \times Id^* + q\_pi$$

Except the generation of the d-axis voltage command Vd* and the q-axis voltage command Vq*, as in the case of the first embodiment, the power converter 1 can be controlled according to the torque command output from the torque-command generating unit 5 based on Equations 7 and 8. Moreover, the power converter 1 can stop immediately after the 1-notch command is turned OFF and the torque command becomes zero. This facilitates the operation for stopping the electric train at a specified position precisely in a railyard or an inspection yard where the position at which the electric train stops is important.

According to the second embodiment, a current transformer (CT) is used as the current detecting units 18a to 18c to detect the currents flowing through a wire connection at which the power converter 1 and the AC motor 2 are connected. Alternatively, any other methods can be employed to detect phase currents based on a current, such as a bus current, flowing through the power converter 1. Because iu+iv+iw=0, the current of a phase w can be calculated based on the currents of two phases u and v detected by the current detecting units 18a and 18b. In this case, the current detecting unit 18c is unnecessary.

Figure 6:
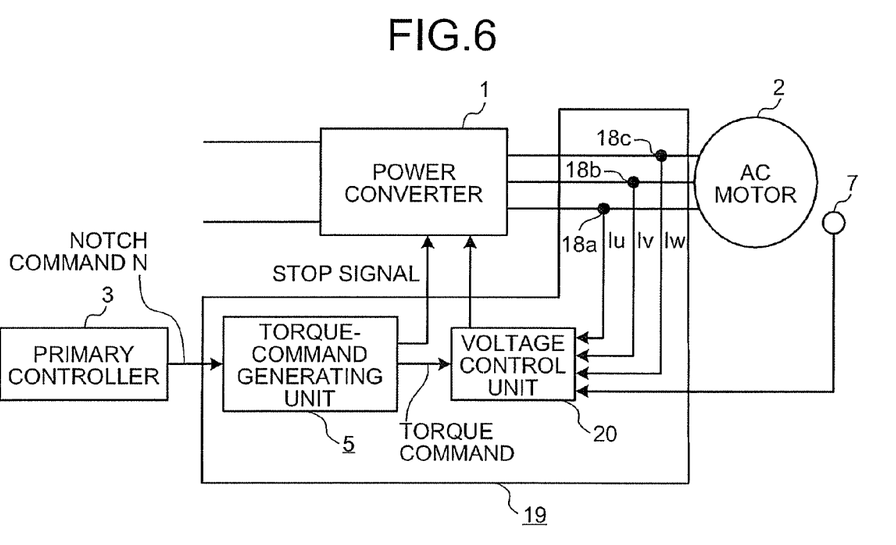
FIG. 6 is a block diagram of a power converting device of an electric train according to a third embodiment of the present invention.

FIG. 6 is a block diagram of a power converting device of an electric train according to a third embodiment of the present invention. The power converting device of the third embodiment is of construction basically similar to that of the second embodiment except for a control unit 19. The a control unit 19 includes a voltage control unit 20.

Based on phase currents iu, iv, and iw detected by the current detecting units 18a to 18c and an inverter angular frequency ωinv calculated by Equation 4, a phase θ is calculated. Specifically, based on the phase θ, the phase currents iu, iv, and iw are converted into a d-axis current Id and a q-axis current Iq. A control coordinate axis is necessary for coordinate conversion of a three-phase voltage or a three-phase current into a two-phase orthogonal rotating coordinate system, and a phase of the control coordinate axis is represented by θ based on the arbitrary angular frequency ω. Because this conversion is well known, explanation thereof is omitted below. Based on a d-axis current command Id* calculated by Equation 2 and a q-axis current command Iq* calculated by Equations 1, the d-axis current Id, and the q-axis current Iq, PI control is performed such that the detected currents correspond to the commands. The result of the control is a d-axis voltage command Vd* and a q-axis voltage command Vq*.

[Equation 11]

$$Vd^* = \left(kp + \frac{\omega ci}{s}\right)(Id^* - Id)$$
$$Vq^* = \left(kp + \frac{\omega ci}{s}\right)(Iq^* - Iq) \quad (11)$$

As in the case of the first embodiment, based on the d-axis voltage command Vd* and the q-axis voltage command Vq*, the power converter 1 can be controlled according to the torque command output from the torque-command generating unit 5 based on Equations 7 and 8. Moreover, the power converter 1 can stop immediately after the 1-notch command is turned OFF and the torque command becomes zero. This facilitates the operation for stopping the electric train at a specified position precisely in a railyard or an inspection yard where the position at which the electric train stops is important.

According to the third embodiment, the amount of calculation can be reduced compared to the first and the second embodiments. Moreover, the torque can be prevented from becoming 0 immediately, which prevents the motor current from increasing abruptly.

Figure 7:
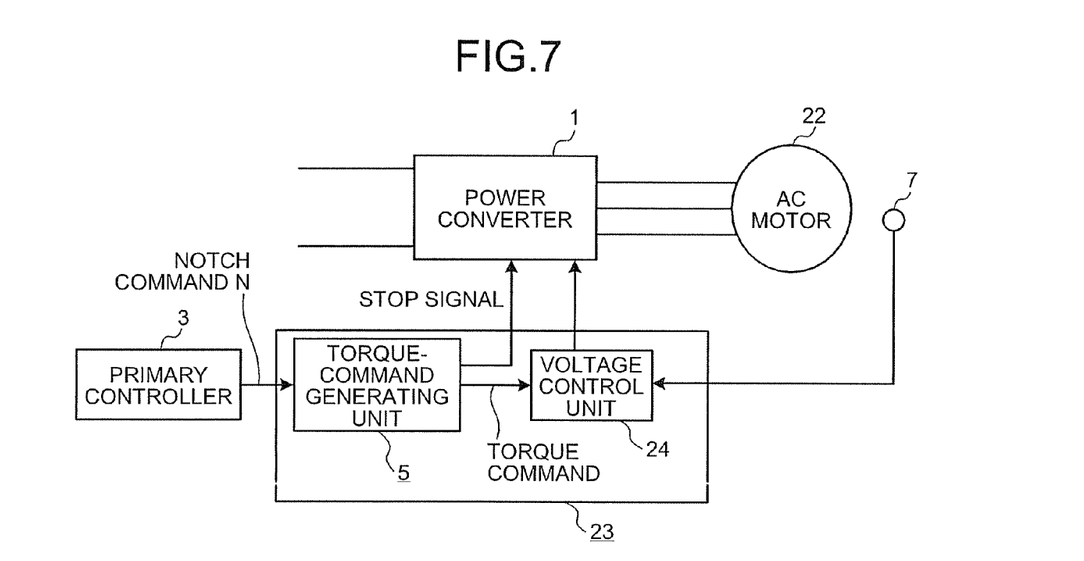
FIG. 7 is a block diagram of a power converting device of an electric train according to a fourth embodiment of the present invention.

FIG. 7 is a block diagram of a power converting device of an electric train according to a fourth embodiment of the present invention. The power converting device of the fourth embodiment is of construction basically similar to that of the first embodiment except for an AC motor 22 and a control unit 23. The AC motor 22 is a synchronous motor. The control unit 23 includes a voltage control unit 24.

The voltage control unit 24 can calculate a d-axis voltage command Vd* and a q-axis voltage command Vq* on the double rotating axes based on an arbitrary angular frequency ω, a torque current command Iq* calculated by Equation 1, a flux current command Id* calculated by Equation 2, and a differential operator. That is, the d-axis voltage command Vd+ and the q-axis voltage command Vq* can be calculated by Equation 12 as follows:

[Equation 12]

$$Vd^* = \left(R + \frac{d}{dt}Ld\right) \times Id^* - \omega \times Lq \times Iq^*$$
$$Vq^* = \omega \times Ld \times Id^* + \left(R + \frac{d}{dt}Lq\right) \times Iq^* + \omega\varphi \quad (12)$$

where Ld is a d-axis inductance, Lq is a q-axis inductance, and Φ is a flux linkage of a permanent magnet that can be calculated based on the motor constant and the characteristics of the AC motor 2.

The torque current command Iq* can be calculated by Equation 13 based on the torque command output from the torque-command generating unit 5, and the flux linkage Φ of the permanent magnet as follows:

[Equation 13]

$$Iq^* = \frac{\tau^*}{\varphi \times P} \quad (13)$$

where P is a pole pair number. The flux current command Id* is an arbitrary constant.

A control coordinate axis is necessary for coordinate conversion of a three-phase voltage or a three-phase current into a two-phase orthogonal rotating coordinate system, and a phase of the control coordinate axis is represented by θ based on the arbitrary angular frequency ω. The phase θ is obtained by a time integration of the arbitrary angular frequency ω, and defined by Equation 14 as follows:

[Equation 14]

$$\theta = \int \omega \cdot dt \quad (14)$$

Based on the d-axis voltage command Vd* and the q-axis voltage command Vq* calculated by Equation 12 and the phase θv calculated by Equation 7, three-phase voltage commands Vu*, Vv*, and Vw* are calculated by Equation 8.

As described, even when a synchronous motor is used as the AC motor 2, the power converter 1 can be controlled according to the torque command that is output from the torque-command generating unit 5 as in the case where an induction motor is used as the AC motor 2. Moreover, the power converter 1 can stop immediately after the 1-notch command is turned OFF and the torque command becomes zero. This facilitates the operation for stopping the electric train at a specified position precisely in a railyard or an inspection yard where the position at which the electric train stops is important.

Figure 8:
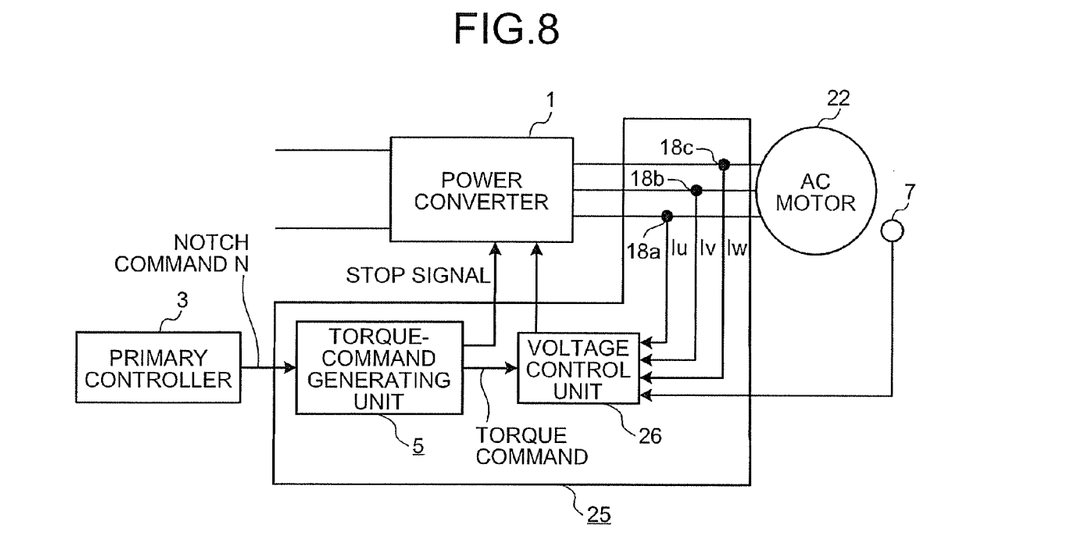
FIG. 8 is a block diagram of a power converting device of an electric train according to a fifth embodiment of the present invention.

FIG. 8 is a block diagram of a power converting device of an electric train according to a fifth embodiment of the present invention. The power converting device of the fifth embodiment is of construction basically similar to that of the third embodiment except for the AC motor 22 and a control unit 25. The AC motor 22 is a synchronous motor. The control unit 25 includes a voltage control unit 26.

Based on phase currents iu, iv, and iw detected by the current detecting units 18a to 18c and an arbitrary angular frequency w calculated by Equation 14, an arbitrary phase θ is calculated. Specifically, based on the phase θ, the phase currents iu, iv, and iw are converted into a d-axis current Id and a q-axis current Iq. A control coordinate axis is necessary for coordinate conversion of a three-phase voltage or a three-phase current into a two-phase orthogonal rotating coordinate system, and a phase of the control coordinate axis is represented by θ based on the arbitrary angular frequency ω. Because this conversion is well known, explanation thereof is omitted below. Based on the d-axis current Id, the q-axis current Iq, a d-axis current command Id*, and a q-axis current command Iq*, PI control is performed such that the detected currents correspond to the commands. The result of the control is a d-axis voltage command Vd* and a q-axis voltage command Vq*.

[Equation 15]

$$Vd^* = \left(kp + \frac{\omega ci}{s}\right)(Id^* - Id)$$
$$Vq^* = \left(kp + \frac{\omega ci}{s}\right)(Iq^* - Iq) \quad (15)$$

As in the case of the first embodiment, based on the d-axis voltage command Vd* and the q-axis voltage command Vq*, the power converter 1 can be controlled according to a torque command output from the torque-command generating unit 5 by Equation 8. Moreover, the power converter 1 can stop immediately after the 1-notch command is turned OFF and the torque command becomes zero. This facilitates the operation for stopping the electric train at a specified position precisely in a railyard or an inspection yard where the position at which the electric train stops is important.

According to the fifth embodiment, the amount of calculation can be reduced compared to the fourth embodiment. Moreover, the torque can be prevented from becoming 0 immediately, which prevents the motor current from increasing abruptly.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A power converting device for an electric train, comprising:
   a power converter that converts direct-current power into alternating-current power;
   an alternating-current motor that is driven by the alternating-current power output from the power converter;
   a primary control unit that outputs a power-running notch command that determines an acceleration speed for the electric train; and
   a control unit that controls an amount of the alternating-current power output from the power converter based on the power-running notch command, wherein the control unit sets the amount of the alternating-current power output from the power converter to zero without a delay after receiving an OFF signal of the power-running notch command during power running, said control unit includes:
      a torque-command generating unit that generates a torque command based on the power-running notch command and that sets the torque command to zero within a time period from 0.1 microsecond to 25 milliseconds after input of the OFF signal of the power-running notch command to the control unit; and
   a voltage control unit that controls a voltage output from the power converter according to the torque command,
   wherein the torque-command generating unit includes:
      a first torque generating unit that sets the torque command to zero within the time period from 0.1 microsecond to 25 milliseconds after input of the OFF signal of the power-running notch command while the primary control unit issues any one of a one-notch signal, a minimum notch command, and a command representing an acceleration speed corresponding to a torque command of 500 Newton-meter or smaller;
      a second torque generating unit that sets the torque command to zero in 100 milliseconds or more after input of the OFF signal of the power-running notch command while the primary control unit issues a power-running notch command other than the one-notch signal, the minimum notch command, and the command representing an acceleration speed corresponding to a torque command of 500 Newton-meter or smaller; and
      a switching unit that switches between the first torque generating unit and the second torque generating unit based on the power-running notch command issued from the primary control unit.

* * * * *